United States Patent [19]

Kawabata et al.

[11] Patent Number: 4,757,434
[45] Date of Patent: Jul. 12, 1988

[54] CONTROL CIRCUIT USED FOR A POWER CONVERSION APPARATUS

[75] Inventors: Takao Kawabata; Yushin Yamamoto, both of Hyogo, Japan

[73] Assignee: Mitsubishi Denki Kabushiki Kaisha, Tokyo, Japan

[21] Appl. No.: 41,042

[22] Filed: Apr. 21, 1987

[30] Foreign Application Priority Data

Apr. 22, 1986 [JP] Japan .................................. 61-91192
Jun. 27, 1986 [JP] Japan ................................. 61-151962
Jan. 17, 1987 [JP] Japan .................................... 62-8473

[51] Int. Cl.$^4$ ......................................... H02M 7/5395
[52] U.S. Cl. ....................................... 363/41; 363/98; 363/132
[58] Field of Search ...................... 363/17, 41, 97, 98, 363/132; 364/161, 162, 163

[56] References Cited

U.S. PATENT DOCUMENTS

| | | | |
|---|---|---|---|
| 3,781,634 | 12/1973 | Jessee | ..................................... 363/41 |
| 3,958,171 | 5/1976 | Sekino | ..................................... 363/41 |
| 4,377,779 | 3/1983 | Plunkett | ............................. 363/41 X |
| 4,541,041 | 9/1985 | Park et al. | ............................... 363/98 |
| 4,546,422 | 10/1985 | Okado | ................................... 363/132 |

OTHER PUBLICATIONS

Y. Sekino et al., Sinano Electric Co., Ltd., "Inverter Output Voltage Waveform Closed-Loop Control Technique", Oct. 1983, pp. 205-212.

Primary Examiner—Peter S. Wong
Attorney, Agent, or Firm—Bernard, Rothwell & Brown

[57] ABSTRACT

A control circuit for a power conversion apparatus, e.g., inverter and cycloconverter, which produces sinusoidal alternating current (AC) power through multiple switching operations of switching devices within a cycle and supplies the power to a load. The control circuit includes a current control minor loop for controlling the instantaneous value of the output current of the power conversion apparatus in compliance with a current reference value which is determined as the sum of the load current component determined basing on the detected value of load current, and the modification current component produced by a voltage controller to current error of output line voltage of said power conversion apparatus with respect of a sinusoidal voltage reference, whereby the output voltage of the power conversion apparatus is controlled accurately to have less distortion against harmonics of the load.

13 Claims, 13 Drawing Sheets

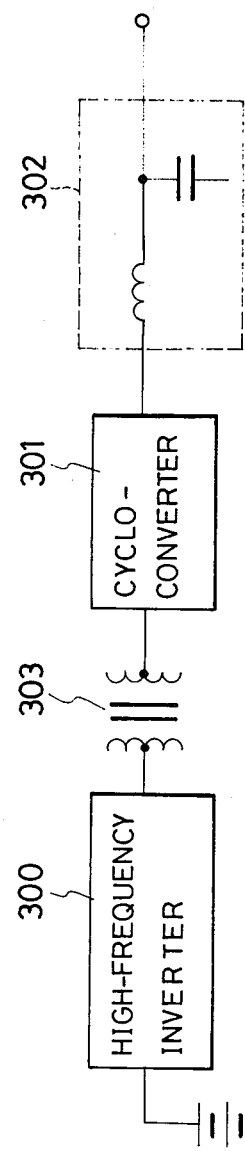

CONTROL CIRCUIT USED FOR A POWER CONVERSION APPARATUS

BACKGROUND OF THE INVENTION

1. Field of the Invention

The present invention relates to a control circuit for controlling the output voltage of a power conversion apparatus such as an inverter and converter, and particularly to a control circuit to obtain accurate and small-distortion sinusoidal output voltage.

2. Description of the Prior Art

In extensive industrial fields, power conversion apparatus such as inverters and converters are used to produce stable and low-impedance electric power. For example, an article entitled "Inverter Output Voltage Waveform Closed Loop Control Technique" in *Intelec Papers*, pp. 205-212, 18-21, Oct. 1983, published in Tokyo, discloses a technique of controlling the inverter output voltage. FIG. 1 is a block diagram derived from FIG. 5 of the above article on page 207 and redrawn to contrast with the present invention. In the figure, the system includes an inverter main circuit 1, a reactor 2 and capacitor 3 making in combination an alternating current (AC) power filter, a direct current (DC) power source 4, a load 5, a drive circuit 6 for the inverter main circuit 1, an AC reference voltage generator 7 for producing a sinusoidal reference voltage, an amplifier 8, and a pulse width modulation (PWM) circuit 9 consisting of a comparator 9a and a carrier wave generator 9b.

Next, the operation will be described. A sinusoidal output voltage in compliance with the control output of the PWM circuit 9 is produced across the capacitor 3. The amplifier 8 and PWM circuit 9 control the switching operation of the inverter 1 so that the output voltage is equal to the sinusoidal reference voltage of the AC reference voltage generator 7.

The PWM circuit 9 made up of a triangular carrier wave generator 9b and comparator 9a operates to determine the switching time point of pulse width modulation in accordance with a virtually sinusoidal signal produced by amplification of the voltage difference by the amplifier 8. Since the amplifier 8 has a certain finite gain for the stability of operation, the output voltage of the inverter 1 has a small error with respect to the reference voltage of the AC reference voltage generator 8, and the system operates such that the inverter output voltage follows the reference voltage.

The conventional control circuit for a converter such as an inverter is constructed as described above, and the inverter operates as a very low-impedance voltage source when the inverter is seen from the load. On this account, a short circuit current in the load or an inrush current of a transformer tends to cause the inverter to have an excessive output current, and the protection of the inverter has been a matter of difficulty. In addition, when the inverter is loaded by a device such as a rectifier which produces many harmonics, the voltage distortion caused by the harmonics of the load cannot be eliminated completely due to the foregoing principle of control operation in which the corrective action takes place after a voltage error has arisen.

SUMMARY OF THE INVENTION

The present invention is intended to solve the foregoing problems, and its prime object is to provide a control circuit for converter with excellent transient characteristics which can supply a sinusoidal voltage with less distortion to both linear and nonlinear loads, and to simplify and ensure the protection of the converter against an excessive load current.

The inventive control circuit for converter generates the command value of the converter output current, which is necessary to obtain sinusoidal output voltage after filtering, from information related to the load current, information related to the current to be applied to the parallel impedance of the filter, and information related to the error of the output voltage from the reference voltage, and incorporates a minor current loop which is responsive instantaneously to the current command value so that the converter is inherently protected from an excessive current caused by an output short circuit or the like.

BRIEF DESCRIPTION OF THE DRAWINGS

FIGS. 7 through 19 are diagrams used to explain the digital sampling control system constructed according to the control circuit shown in FIG. 6, in which, FIG. 7 is a block diagram showing the system arrangement;

FIG. 8 is a block diagram of the main circuit in the continuous system;

FIG. 9 is a block diagram of the main circuit in the sampled-data system;

FIG. 10 is a block diagram showing the overall Dead Beat current control system of a proportion-integration system;

FIG. 11 is a block diagram showing the controller for the sampled-data Dead Beat current control;

FIG. 12 is a diagram of the model of the voltage control system;

FIG. 13 is a block diagram of the quadratic prediction of load current;

FIG. 14 is a block diagram showing the overall Dead Beat voltage control;

FIG. 15 is a block diagram of the controller for the sampled-data Dead Beat voltage control;

FIG. 16 is a time chart illustrating the calculation process of the Dead Beat current control and load current prediction;

FIG. 17 is a block constitution diagram showing a specific circuit for executing the digital sampling control;

FIG. 18 is a flow chart illustrating the execution process of the control program, in which FIG. 18A shows the execution process of the initialization program at the power source turned on, and FIG. 18B shows the calculation process of the Dead Beat control;

FIGS. 19(a) through 19(e) are the waveforms at various portions of the arrangement of FIG. 6 in carrying out the Dead Beat control; and FIG. 20 is a block diagram showing the third embodiment of the inventive power conversion apparatus control circuit.

DESCRIPTION OF THE PREFERRED EMBODIMENTS

Preferred embodiments of the present invention will be described in detail with reference to the drawings.

Figure 2:
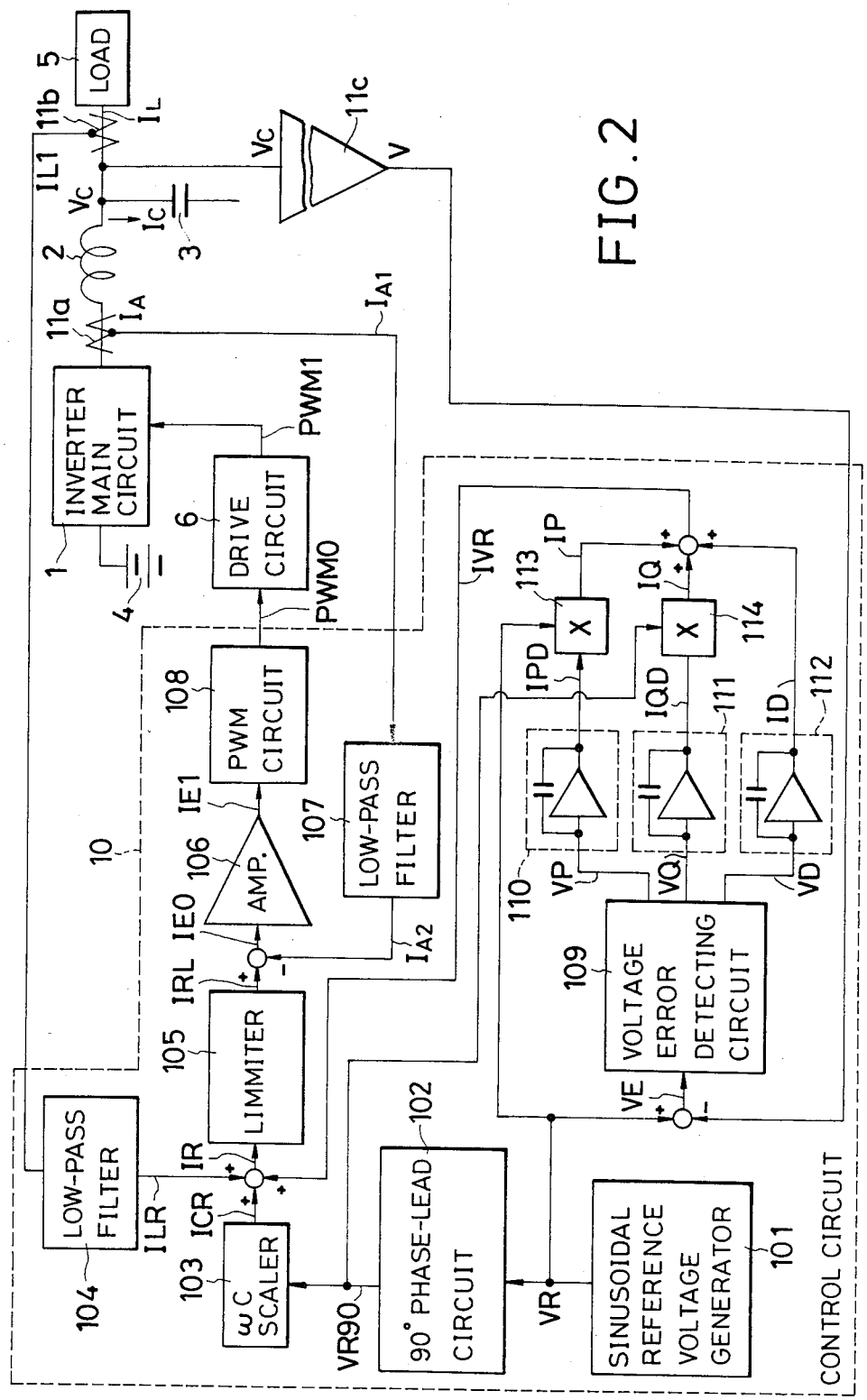
FIG. 2 is a block diagram showing the first embodiment of the present invention.
Figure 3A:
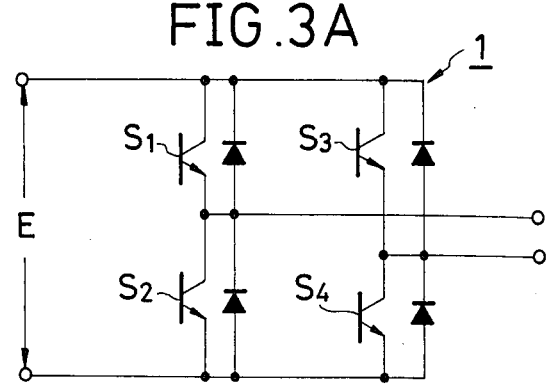
FIGS. 3A and 3B are schematic diagrams showing examples of the inverter main circuit concerning this invention.
Figure 3B:
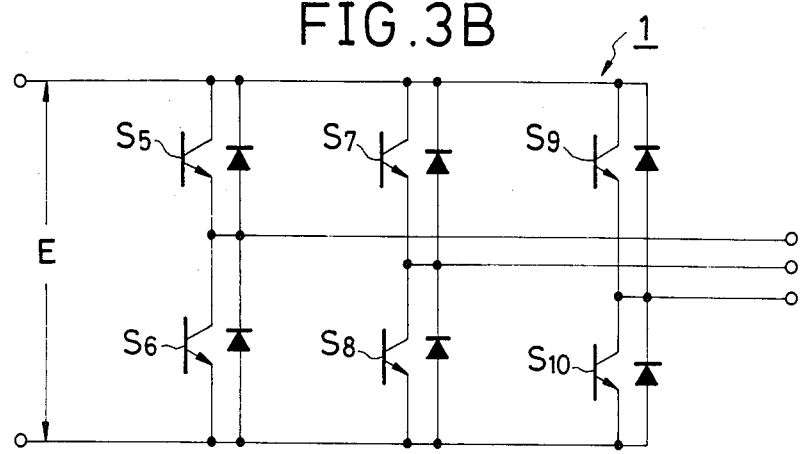

FIG. 2 shows in block diagram an embodiment of this invention, in which reference number 1 denotes a voltage-type inverter, which converts DC power into AC power with an arbitrary voltage and frequency. The inverter typically includes a single-phase or three-phase full-wave bridge circuit including switching devices S1–S4 as shown in FIG. 3A or switching devices S5–S10 as shown in FIG. 3B operative in pulse width modulation by a triangular wave carrier of 1–2 kHz or higher. And a reactor 2 and a capacitor 3 remove higher harmonics to get sinusoidal output voltage.

The arrangement of FIG. 2 further includes a DC power source 4, a load 5, a drive circuit 6 for the switching devices, e.g., S1–S4 or S5–S10, of the inverter 1, and a control circuit 10. A current sensor 11a is provided at the output of the inverter 1 so as to detect the inverter output current $I_A$, and another current sensor 11b is provided at the input of the load 5 so as to detect the load current IL. A voltage sensor 11c detects and feeds back the inverter output voltage $V_C$ to the control circuit. In the figure, reference numbers above 100 are given to components of the control circuit 10. The control circuit 10 includes an AC sinusoidal reference voltage generator 101, a phase-lead circuit 102 which advances the phase of the AC reference voltage VR by 90° to produce a signal VR90 (it is also possible to produce the VR signal from the VR90 signal by retardation), a scaler 103, a low-pass filter 104 which removes high-frequency components in the load current IL which the inverter cannot follow, a limiter 105 which limits the inverter current command value IR below the inverter allowable value, a current control amplifier 106, a low-pass filter 107 which removes a ripple component created by PWM modulation in the inverter output current $I_A$, a voltage error detecting circuit 109, integrating amplifiers, 110, 111 and 112, and multipliers 113 and 114.

Figure 4:
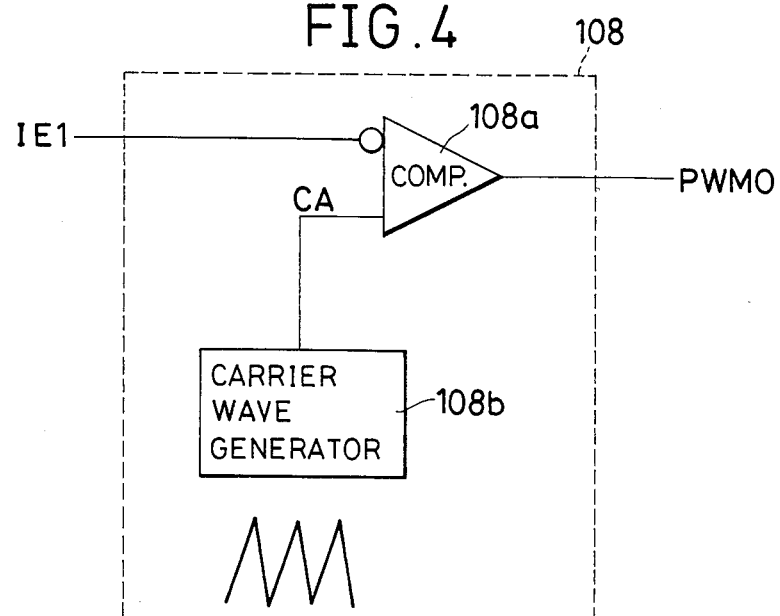
FIG. 4 is a block diagram of the PWM circuit in the first embodiment shown in FIG. 2.

FIG. 4 shows in block diagram a PWM circuit 108 used in the embodiment of FIG. 2, and it consists of a comparator 108a and a carrier wave generator 108b which generates a carrier signal in triangular wave.

Figure 5:
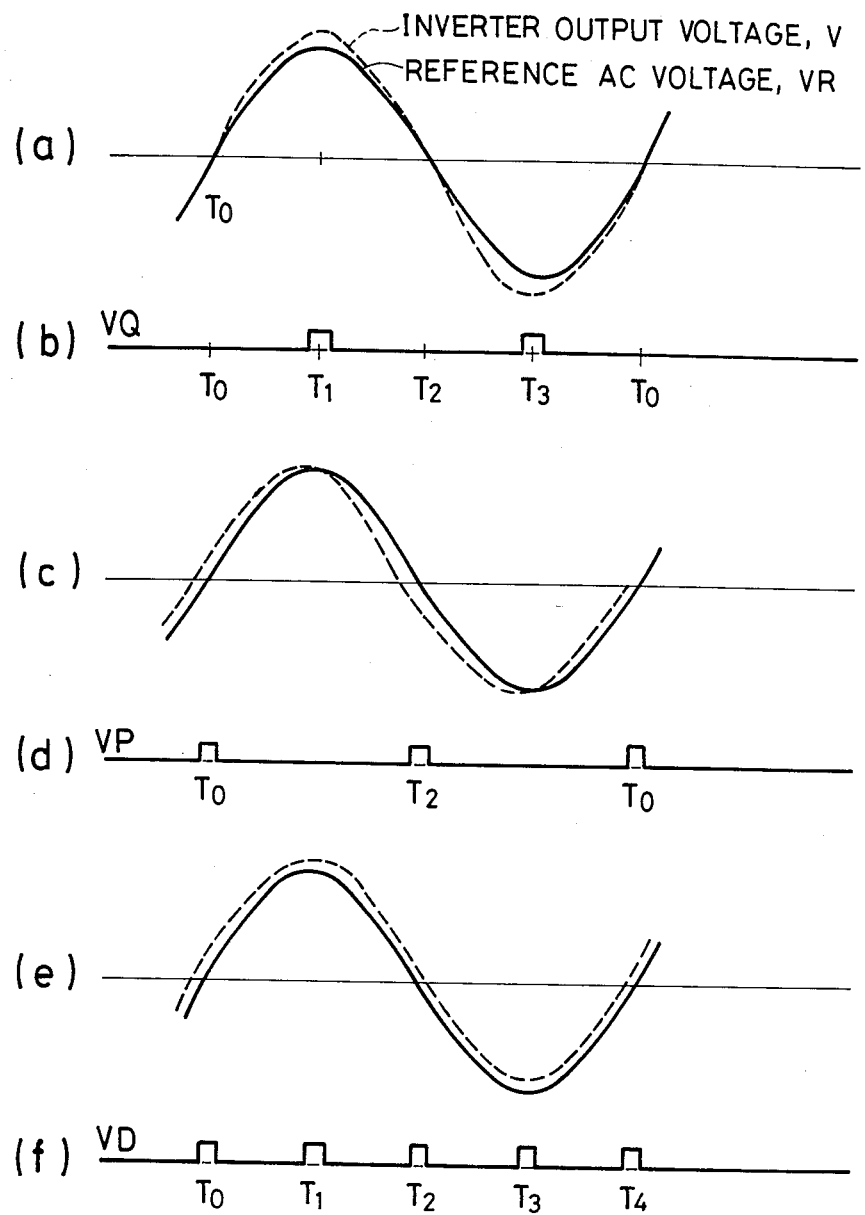
FIG. 5 is a signal waveform diagram used to explain the operation of the voltage error detecting circuit which constitutes the control circuit of the first embodiment shown in FIG. 2.

Next, the operation of this embodiment will be described with reference to FIGS. 2, 4 and 5. FIG. 5 explains the operation of the voltage error detecting circuit. In this embodiment, the control circuit 10 includes a current control minor loop for implementing the high-response current control and a voltage control loop which is lower in response than the minor loop. By the current control minor loop, the inverter output current $I_A$ responds instantaneously to the current command value IRL which has been set so that the inverter produces the sinusoidal AC voltage, and the sinusoidal output voltage which follows the AC reference voltage is produced. In more detail, the current control minor loop operates as follows. The inverter output current $I_A$ is detected by the sensor 11a as a current signal $I_{A1}$, and it is rid of a ripple component caused by PWM modulation by the low-pass filter 107 to become a current signal $I_{A2}$. The error of the inverter output current $I_A$ from the current command value IRL is amplified by the amplifier 106, which provides its output IE1 to the PWM circuit 108. The modulation output PWMO is amplified through the drive circuit 6, which applies the output PWM1 to the inverter, and it is controlled in PWM mode. By provision of a smaller time lag and a higher gain for the current control minor loop, a highly responsive current control is achieved.

Next, the determination of the current command value IRL and the operation of the voltage control loop will be described. The current which is to be produced by the inverter is the sum of the current Ic flowing through the capacitor 3 and the load current IL. Accordingly, the inverter current command value IR is the capacitor current ICR plus the load current command value ILR added by a small compensation IVR for minimizing the voltage error.

The capacitor current command value ICR is obtained as follows. First, the capacitor voltage Vc and capacitor current Ic are in this relation:

$$C\frac{d}{dt}Vc = Ic$$

With the capacitor voltage being $Vc = Vcp \sin(\omega t)$, $$I = C\frac{d}{dt}Vc = \omega C\, Vcp \sin(\omega t + 90°)$$

where Vcp is the peak value of the capacitor voltage Vc.

Accordingly, the current to be supplied to the capacitor in order to produce the prescribed sinusoidal voltage has a magnitude which is the AC reference voltage VR with a 90° lead phase multiplied by the value of $\omega C$. Accordingly, the capacitor current command value ICR can be obtained from the output of the 90°-lead circuit 102 by way of the scaler 103 having a constant gain $\omega C$. With the current control loop following the reference value which advances by 90° from the voltage reference as explained above, the inverter can establish the rated voltage in the no-load condition. In this state of no-load voltage establishment, the inverter is operating with the parallel capacitor connected in parallel to the current source, and it does not behave as a low-impedance voltage source required for the general sinusoidal output inverter. To cope with this matter, the inventive arrangement is made so that the current control minor loop of the inverter quickly follows the current demanded by the load, thereby acting as a low-impedance voltage source seen from the load. The load demand current will have a distorted waveform including many harmonics in such a case of a rectifier load. By producing the distorted current waveform without delay, the current source inverter can apparently serve as a voltage source.

However, in consideration that harmonic load current components above 11th order, for example, are supplied from the output capacitor 3 and they do not cause a significant voltage distortion, and that the current control minor loop of extremely high response is uneconomical, it is designed such that load current harmonics above 11th order are mainly supplied from the parallel capacitor 3 and those below the 7th order are supplied from the inverter, for example. Namely, the low-pass filter 104 is used to reduce harmonics above 11th order and admit harmonics below the seventh order so as to produce a current reference ILR pertinent to the load current including the fundamental to harmonic components up to seventh order, and the inverter is made to follow the reference, whereby the inverter operation which does not increase the voltage distortion due to a nonlinear load can be accomplished.

Next, the purpose of the voltage control loop for producing the modification component IVR and its operation will be described. The foregoing control system is a feedforward control for the capacitor current IC to follow an intended sinusoidal current ICR, and also the load current command value ILR is fed forward. Therefore, the capacitor current IC which is nearly equal to the intended current ICR is obtained, whereas the inverter output voltage Vc has a small error VE with respect to the AC reference voltage VR due to a limited accuracy of the capacitance of the capacitor 3 and a steady-state error of the current control minor loop. On this account, a compensating current IVR which minimizes the error VE is produced and added to the inverter current command value.

The terms of compensation IVR are evaluated as follows. First, the voltage error VE is decomposed by the voltage error detection circuit 109 into a voltage error VP which relates to the active current, an error VQ which relates to the reactive current and an error VD which relates to the DC current. An increase of the active current in the inverter output current $I_A$ causes the inverter output voltage Vc to have a lead phase, while an increase of the reactive current causes the inverter output voltage Vc to have an increased amplitude. By adding a small DC current to the command, an unbalanced inverter output voltage, in the positive and negative mean value, can be corrected. Some examples of this operation by the voltage error detection circuit 109 are depicted in FIG. 5.

FIG. 5(a) shows the case of an error in the voltage amplitude with respect to the reference voltage of the same phase. This error varies depending on the reactive current of the inverter, and the error appears significantly at portions of 90° and 270° of the reference voltage. Accordingly, by detecting the error at timings T1 and T3 in FIG. 5(b), a signal VQ which reflects the amplitude error can be evaluated through the following calculation.

$$VQ = V(T1) - VR(T1) - V(T3) + VR(T3)$$

FIG. 5(c) shows the case of an error in the phase with respect to the reference voltage. This error varies depending on the active current of the inverter, and the error appears significantly at portions of 0° and 180° of the reference voltage. Accordingly, by detecting the error at timings T0 and T2 in FIG. 5(d), a signal VP which reflects the phase error can be evaluated through the following calculation.

$$VP = V(T0) - VR(T0) - V(T2) + VR(T2)$$

FIG. 5(e) shows the case of an error in the DC component with respect to the reference voltage. This error is constant over the entire period, and it can be detected as shown in FIG. 5(f) through the following calculation.

$$VD = V(T0) - VR(T0) + V(T1) - VR(T1) + V(T2) - VR(T2) + V(T3) - VR(T3)$$

In the above error detections, the signal VQ represents the amplitude error which can be corrected by the reactive current, the signal VP represents the phase error which can be corrected by the active current, and the signal VD represents the positive-to-negative balance error which can be corrected by the DC current. These signals are processed by the integrating amplifiers 110, 111 and 112 and the multipliers 113 and 114, and converted into a compensation active current IP, compensation reactive current IQ and compensation DC current ID, with their sum representing the terms of compensation IVR. This value IVR is for the correction of a small voltage error, and its magnitude is smaller than the capacitor current command value ICR. The integrating amplifiers 110, 111 and 112 have a property of saturation so as to provide a limit on the compensation value IVR. The IVR finely adjusts the inverter output current so that the error becomes minimal. Although in the foregoing embodiment the signals VQ, VP and VD are detected by sampling, it is of course possible to detect the similar signals in a continuous manner.

In FIG. 2, the sum of the current command values ICR, ILR and IVR is applied through the limiter 105 to the current control minor loop including the amplifier 106. By the presence of the limiter 105, no command value in excess of the maximum allowable instantaneous current of the inverter is issued at any transitional state, and the inverter operates safely by being protected from over-current inherently.

Figure 6:
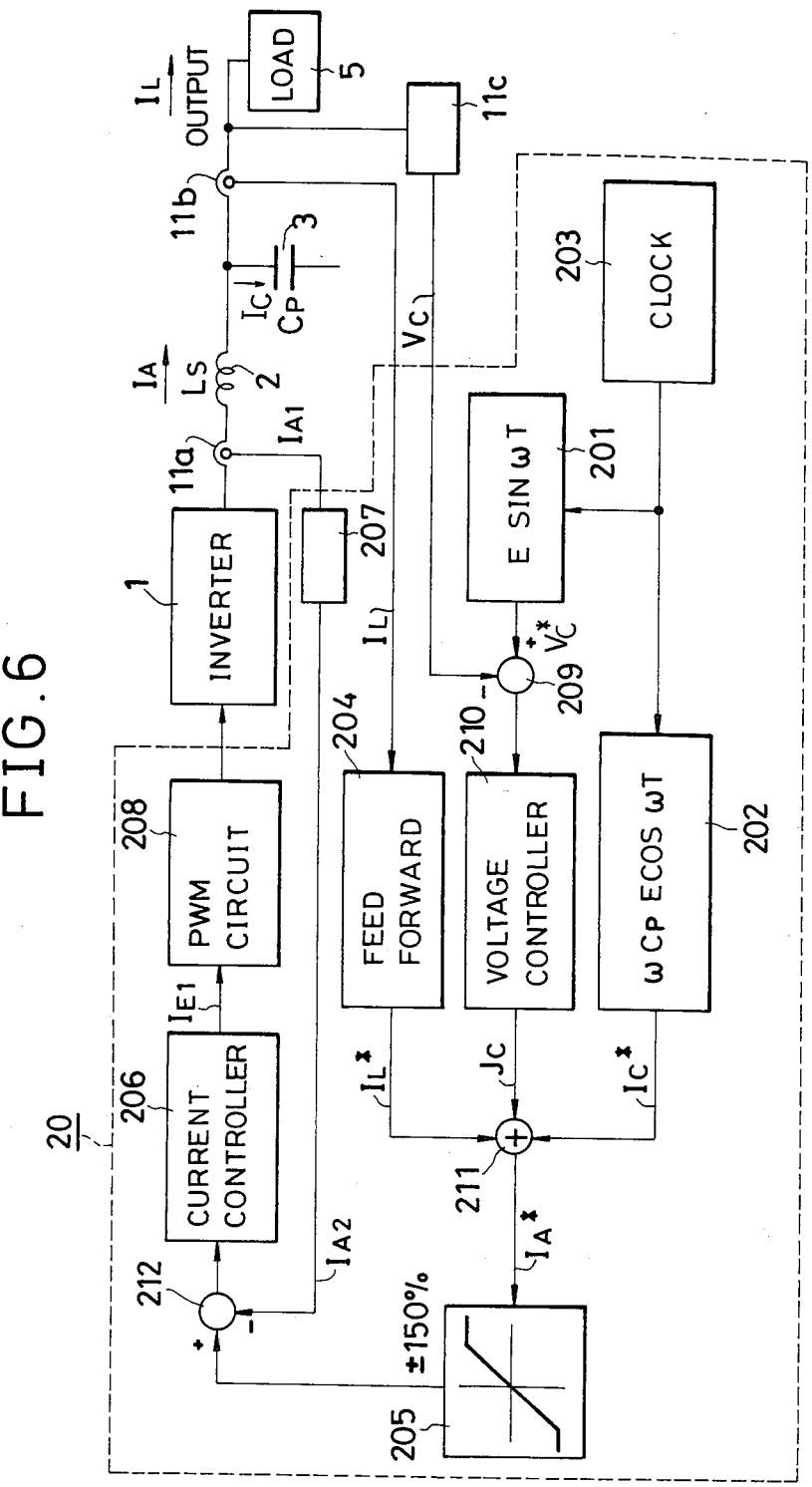
FIG. 6 is a block diagram showing the second embodiment of this invention.

Although in the foregoing embodiment the control circuit 10 is arranged so that the terms of compensation IVR is produced through the compensation by the integrating amplifiers 110, 111 and 112 and the multipliers 113 and 114 based on the outputs of the voltage error detection circuit 109, the present invention is not confined to this scheme, but the control circuit 10 may be arranged as shown in FIG. 6 and described in the following as the second embodiment of this invention.

Figure 1:
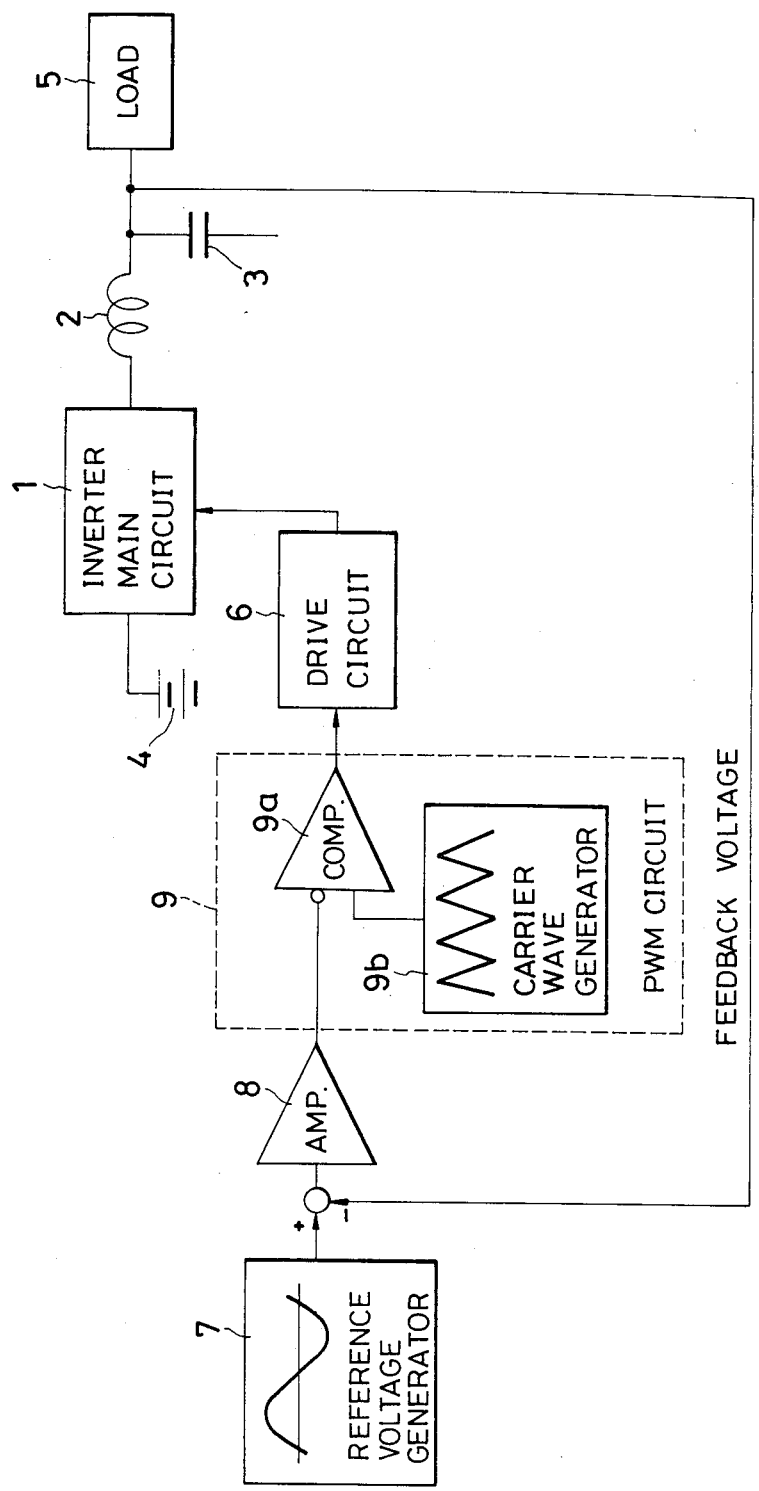
FIG. 1 is a block diagram showing the conventional control circuit for usual inverter.

In FIG. 6, components equal or equivalent to those shown in FIGS. 1 and 2 are referred to by the common symbols, and the DC power source 4 and drive circuit 6 are omitted for clarifying the drawing. The control circuit 20 of the second embodiment includes components indicated by reference numbers above 200, which are an AC sinusoidal reference voltage generator 201, a command value $I_C^* = \omega CpE \cos \omega t$ generator 202 which is the current reference for the capacitor and is in 90° lead phase with respect to the AC reference voltage $V_C^* = E \sin \omega t$ produced by 201, a clock generator 203 which provides a time base for these circuits, a voltage error detection circuit 209, a voltage control circuit 210 which produces a control signal $J_C$, a circuit 204 which produces a feed-forward control signal $I_L^*$ for the load current based on the detected value $I_L$ of the load current, an adder 211 which produces a sum $I_A^*$ of the above signals $I_C^*$, $J_C$ and $I_L^*$, a limiter 205 which limits the inverter current command value $I_A^*$ to the inverter allowable current, a current control amplifier 206, a low-pass filter 207 which removes a ripple component in the inverter output current $I_A$ caused by pulse width modulation, and a PWM circuit 208.

Next, the operation of this embodiment will be described with reference to FIG. 6. In this embodiment, the control circuit 20 includes a current control minor loop which implements the instantaneous current control and a voltage control loop having a sufficiently high response. A current command value $I_A^*$ necessary for the inverter to produce the sinusoidal AC output voltage is evaluated and the inverter output current $I_A$ is made to follow the command value through the current control minor loop, and a sinusoidal output voltage which follows the AC reference voltage is produced. In more detail, the current control minor loop operates as follows. The inverter output current $I_A$ is detected by a sensor 11a, which produces a current signal $I_{A1}$, and the signal is fed through the low-pass filter 207 so that it is rid of a ripple component caused by pulse width modulation to become a current signal $I_{A2}$. The error of the inverter output current $I_A$ from current command value $I_A^*$ is amplified by the amplifier 206, which provides its output $I_{E1}$ to the PWM circuit 208, and the modulation output is applied to the inverter so that it is controlled in PWM mode. A high response operation of the system is achieved by making a smaller delay and higher gain for the current control minor loop.

Next, the determination of the current command value $I_A^*$ and the operation of the voltage control loop will be described. The current which the inverter is to produce is the current $I_C$ flowing through the capacitor 3 and the load current $I_L$. Accordingly, the inverter current command value $I_A^*$ is the sum of the capacitor current command $I_C^*$ and load current command value $I_L^*$ added by the terms of compensation $J_C$ for minimizing the voltage error.

The capacitor current command value ICR is calculated as follows. First, the relation between the capacitor voltage $V_C$ and capacitor current $I_C$ is expressed by the following formula.

$$I_C = C_P \frac{d}{dt} V_C = C_P \frac{d}{dt} (E \sin\omega t) = \omega C_P E \cos\omega t$$

Accordingly, the current to be applied to the capacitor in order to produce a rated sinusoidal voltage is $\omega C_P E \cos\omega t$ which advances by 90° relative to the AC reference voltage $E \sin\omega t$. By making the current control loop to follow this command value, the inverter can establish the rated voltage in a no-load condition. In this state of no-load voltage establishment, the inverter is operating with a capacitor connected in parallel to the current source, and it does not behave as a low-impedance voltage source required for a usual sinusoidal output inverter. On this account, according to this invention, the current control minor loop of the inverter is arranged so that it is highly responsive to the current demanded by the load, so that the system becomes a low-impedance voltage source seen from the load. The load demand current will have a distorted waveform including many harmonics in such a case of a rectifier load. By applying such load current waveform as a feed-forward signal so that the inverter produces the output current without delay, the current source inverter acts as an apparent sinusoidal voltage source.

In practice, however, the inverter operation cannot easily follow high order harmonic components above 20th order for example. And also ripple components caused by pulse width modulation will be included in the output. These high-order harmonic components are supplied from the filter capacitor Cp so that a sinusoidal output can be obtained.

Next, the purpose of the voltage control loop for producing the compensation value $J_C$ and its operation will be described. The control system described above is a feedback control for the capacitor current $I_C$ to follow the intended sinusoidal current $I_C^*$, added by a feed-forward of the load current command value $I_L^*$. The voltage control major loop provided outside of the minor loop has a function of system stabilization by correcting the deviation of the output voltage from the command sinusoidal voltage caused by various variations and indeterminate factors as follows.

(i) An output voltage deviation due to the inverter's inability to follow a too sharp variation of the load current.

(ii) An output voltage deviation due to the error of the current control loop caused by an abrupt change in the d.c. input voltage to the inverter.

(iii) A current error due to a time lag in the switching operation and inverter arm short-circuit preventive time Td.

The output voltage disturbance induced by these causes makes the load current distinct from its inherent wave form, and feed-forward of a detected load current will further disturb the output voltage, resulting in an unstable system. In order to stabilize the control system by correcting such an instantaneous disturbance of the output voltage, the voltage control system provides the compensation signal $J_C$ responsively so as to maintain the sinusoidal waveform of the output voltage.

The sum of the three signals $I_C^*$, $I_L^*$ and $J_C$, which is limited below the maximum allowable current of the switching devices by being fed through the limiter, is applied as a reference to the current control minor loop, and the inverter operates stably while suppressing an excessive output current by its own quality.

In contrast to the analog configuration of the control systems described above, the following introduces a digital sampling control system, called here "dual Dead Beat" control system which is revealed in the present invention. The Dead Beat control is a generic term which denotes a finite time settlement control system.

Figure 7:
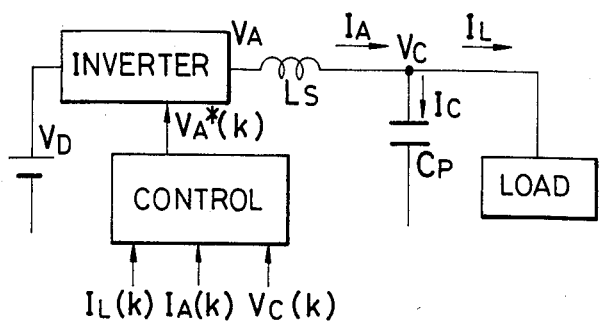

FIG. 7 shows the arrangement of this system. For state variables $I_A$ and $V_C$, an input variable $V_A$ and an external disturbance $I_L$, as shown in the figure, sampled state equations will be derived. Parameters used in the following are defined as follows.

$V_D$: Battery voltage, $V_A$: Inverter output voltage,
$V_C$: Capacitor voltage, $I_A$: Inverter output current,
$I_C$: Capacitor current, $I_L$: Load current, $V_A^*(k)$: Inverter voltage command value, $V_C(k)$: Capacitor voltage detected value, $I_A(k)$: Inverter output current detected value, $I_L(k)$: Load current detected value, $L_s$: Output filter reactor,
$C_P$: Output filter capacitor First, the circuit equations are given as:

$$\left. \begin{aligned} \frac{dI_A}{dt} &= \frac{1}{L_s} V_A - \frac{1}{L_s} V_C \\ \frac{dV_C}{dt} &= \frac{1}{C_P} I_C = \frac{1}{C_P} I_A - \frac{1}{C_P} I_L \end{aligned} \right\} \quad (1)$$

The equations (1) can be expressed in the form of matrix as follows.

$$\begin{pmatrix} \dot{I}_A \\ \dot{V}_C \end{pmatrix} = \begin{pmatrix} 0 & \frac{-1}{L_s} \\ \frac{1}{C_P} & 0 \end{pmatrix} \cdot \begin{pmatrix} I_A \\ V_C \end{pmatrix} + \quad (2)$$

$$\left(\begin{array}{c}\frac{1}{L_s}\\0\end{array}\right)V_A+\left(\begin{array}{c}0\\\frac{-1}{C_p}\end{array}\right)I_L$$

Figure 8:
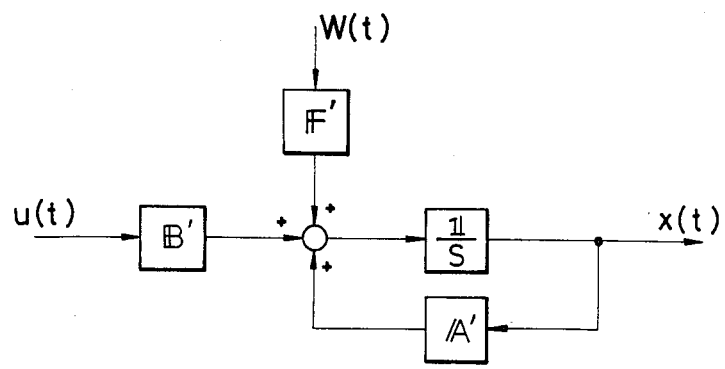

By the replacement using the following equation (3), equation (2) is expressed by the block diagram shown in FIG. 8.

$$Ix(t) = IA'x(t) + IB'u(t) + IFw(t) \tag{3}$$

where Ix denotes state variables, u denotes an input variable, w denotes an external disturbance and II denotes a unit matrix.

Figure 9:
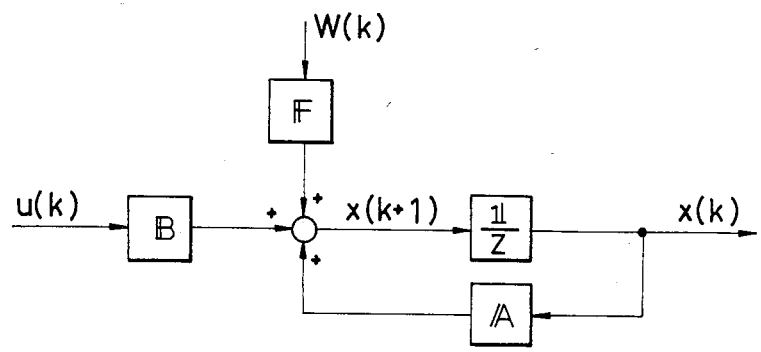

Next, with the assumptions of $V_A(t)=V_A(kT)$ and $I_L(t)=I_L(kT)$ between time interval $kT\leq t\leq(k+1)T$ (where T is a discretization period), equation (3) gives a discrete status equation (4) and the block diagram becomes as shown in FIG. 9.

$$Ix(k+1) = IAx(k) + IBu(k) + IFw(k) \tag{4}$$

where $'A$, $'B$ and $'F$ are expressed by equations (5), (6) and (7), respectively, in which $\alpha = 1/\sqrt{L_sC_p}$. The equations (5), (6) and (7) are introduced from publication "Digital Control Systems", Chapter 4, by B. C. Kuo.

$$IA(T) = \mathcal{J}^{-1}[(SII - IA)^{-1}] = \tag{5}$$

$$\begin{pmatrix}\cos\alpha T & \frac{-1}{L_s\alpha}\sin\alpha T\\ \frac{1}{C_p\alpha}\sin\alpha T & \cos\alpha T\end{pmatrix} = \begin{pmatrix}a_{11} & a_{12}\\ a_{21} & a_{22}\end{pmatrix}$$

$$IB(T) = \int_0^T IA(T-r)IB'dr = \begin{pmatrix}\frac{1}{L_s\alpha}\sin\alpha T\\ 2\sin^2\frac{\alpha T}{2}\end{pmatrix} = \begin{pmatrix}b_1\\b_2\end{pmatrix} \tag{6}$$

$$F(T) = \int_0^T IA(T-r)IFdr = \begin{pmatrix}2\sin^2\frac{\alpha T}{2}\\ \frac{-1}{C_p\alpha}\sin\alpha T\end{pmatrix} = \begin{pmatrix}f_1\\f_2\end{pmatrix} \tag{7}$$

First, the Dead Beat system for the current control minor loop is formed as follows. From equations (4) to (7), the inverter output current is expressed by the following equation.

$$I_A(k+1) = a_{11}I_A(k) + a_{12}V_C(k) + b_1V_A(k) + f_1I_L(k) \tag{8}$$

Placing $a_{11}=A$, $b_1=-a_{12}=B$, and $f_1=F$, z-transformation of the equation results as follows.

$$ZI_A(Z) = AI_A(Z) - BV_C(Z) + BV_A(Z) + FI_L(Z) \tag{9}$$

Figure 10:
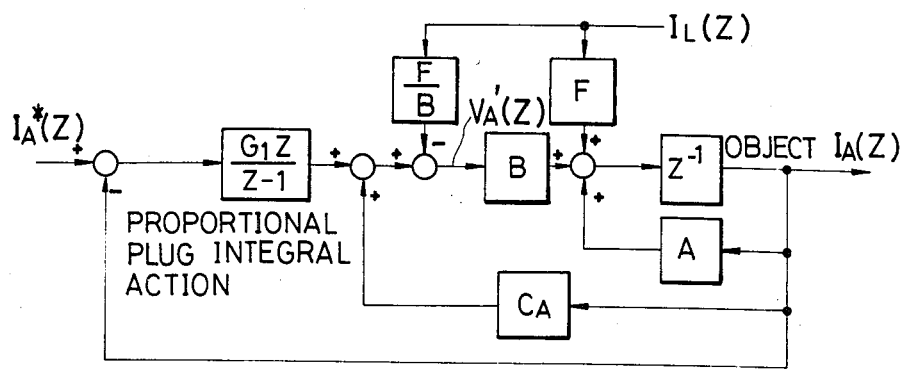

Placing the reactor application voltage to be $V'_A(Z) = V_A(Z) - V_C(Z)$, and providing a feed-forward term $(F/B)I_L(Z)$ so as to cancel the disturbance term $FI_L(Z)$ caused by the load current, the Dead Beat system is formed as a proportion-integration system as shown in FIG. 10.

The terms pertinent to $I_L(Z)$ cancel each other, and the loop transfer function $G_0(Z)$ by exclusion of these terms is given as follows.

$$G_0(Z) = \frac{G_1Z}{Z-1} \times \frac{B}{Z-(A+G_2B)} = \tag{10}$$

$$\frac{G_1BZ}{Z^2 - (G_2B+A+1)Z - (A+G_2B)}$$

In this case, the characteristic equation $1+G_0(Z)$ for the closed loop system becomes as follows.

$$Z_2 - \{(G_2-G_1)B+A+1\}Z + (A+G_2B) = 0 \tag{11}$$

By making two roots of the equation equal to zero as the condition of finite settlement, $G_1=1/B$ and $G_2=-A/B$ are obtained.

Figure 11:
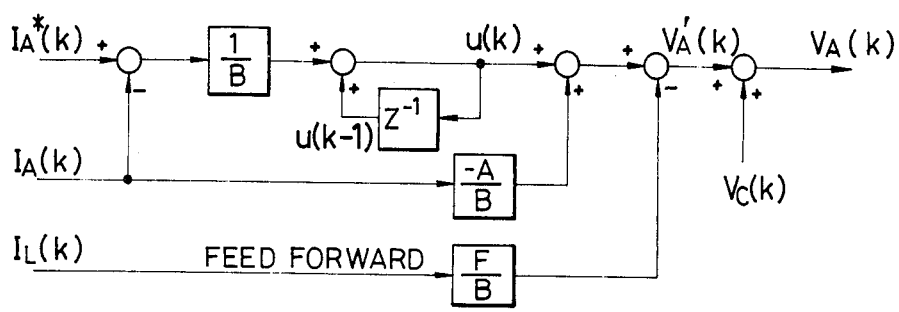

By inverse Z-transformation for the control system shown in FIG. 10 and by addition of the capacitor voltage component, a sampled-data current control system is formed, with the result shown in FIG. 11.

Figure 12:
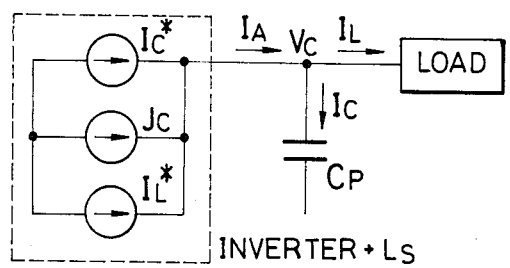

Next, the voltage control system is formed with the assumption that the inverter and output filter reactor in combination act as an ideal current source, as shown in FIG. 12.

Figure 13:
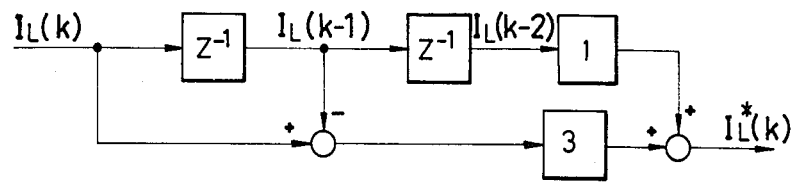

A predicted value $I_L*(k)$ used here is obtained by quadratic prediction (4) shown in the block diagram of FIG. 13. The second order prediction is the method in which load current values $I_L$ at three time points, $t=kT_S$, $t=(k-1)T_S$ and $t=(k-2)T_S$, are used to assume a quadratic curve and load current values in the future, e.g., $t=(k+1)T_S$ and $t=(k+2)T_S$, are predicted on the curve.

Based on FIG. 12, the circuit equation is derived to as follows.

$$\frac{dV_C}{dt} = \frac{1}{C_p}I_C = \frac{1}{C_p}(I_A - I_L) = \tag{13}$$

$$\frac{1}{C_p}(I_C* + I_L* + J_C - I_L)$$

Assuming $I_L*$ to be nearly equal to $I_L$ equation (13) is reduced to as follows.

$$\frac{dV_C}{dt} = \frac{1}{C_p}(I_C* + J_C) \tag{14}$$

Making equation (14) discrete with time T results in the following equation.

$$V_C(k+1) = V_C(k) + \frac{T}{C_p}\{I_C*(k) + J_C(k)\} \tag{15}$$

By placing the error of the capacitor voltage with respect to the reference value to be $E_{VC}(k) = V_C(k) - V_C*(k-1)$, equation (15) is reduced to (16).

$$V_C(k+1) = V_C*(k-1) + E_{VC}(k) + \tag{16}$$

$$\frac{T}{C_p}I_C*(k) + \frac{T}{C_p}J_C(k)$$

Accordingly, based on $V_C*(k) = V_C*(k-1) + (T/C_p)I_C*(k)$, equation (16) is reduced to as follows.

$$E_{VC}(k + 1) = E_{VC}(k) + \frac{T}{C_p} J_C(k) \quad (17)$$

Through Z-transformation of equation (17), the following equation results.

$$ZE_{VC}(Z) = E_{VC}(Z) + \frac{T}{C_p} J_C(Z) \quad (18)$$

Figure 14:
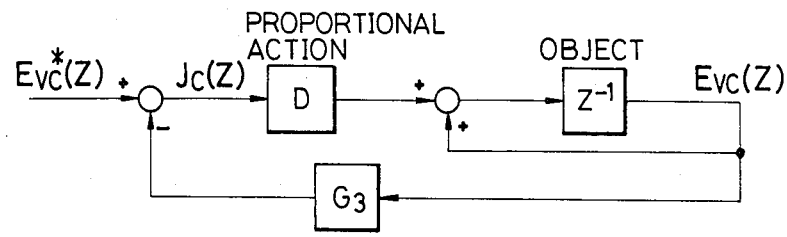

Forming the voltage control system as a proportional control system as shown in FIG. 14, the value of $G_3$ for attaining a finite settlement is obtained. The voltage control system has its loop transfer function $G_0(Z)$ as follows.

$$G_0(Z) = \frac{(T/C_p)G_3}{Z - 1} \quad (19)$$

Figure 15:
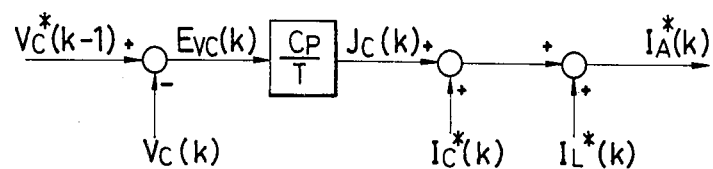

Then, by making zero the root of the characteristic equation of the loop transfer function, $G_3 = C_p/T$ is obtained. Furthermore, through the inverse Z-transformation for the control system of FIG. 14, a sampled-data voltage control system shown in FIG. 15 can be obtained.

The primary feature of this method is the provision of a voltage control system outside of a current control system to form a dual Dead Beat control system. Because of a high response operation realized by Dead Beat control for the voltage control system, voltage deviations induced by the causes which have been itemized in (i)-(iii) can be corrected promptly and a stable control system is realized.

Actually to realize Dead Beat control as mentioned above, necessary computing time for the above explained control becomes a problem, because the inverter can not generate an output pulse, before the computing of each sampling time is completed. So, if necessary computing time is $T_C$, sampling time $T_S$ of more than 10 times $T_C$ is usually adopted to get high utilization of inverter pulse width. In case of above mentioned Dead Beat control, usually the computing time $T_C$ of 100 to 300 μs is necessary. And if the computing time $T_C$ of 100 μs is supposed, the sampling time $T_S$ becomes around 1 ms. Then PWM switching frequency can not be raised above 1 kHz. To overcome this problem, a special new method of compensation of computing time is introduced as explained below.

Figure 16:
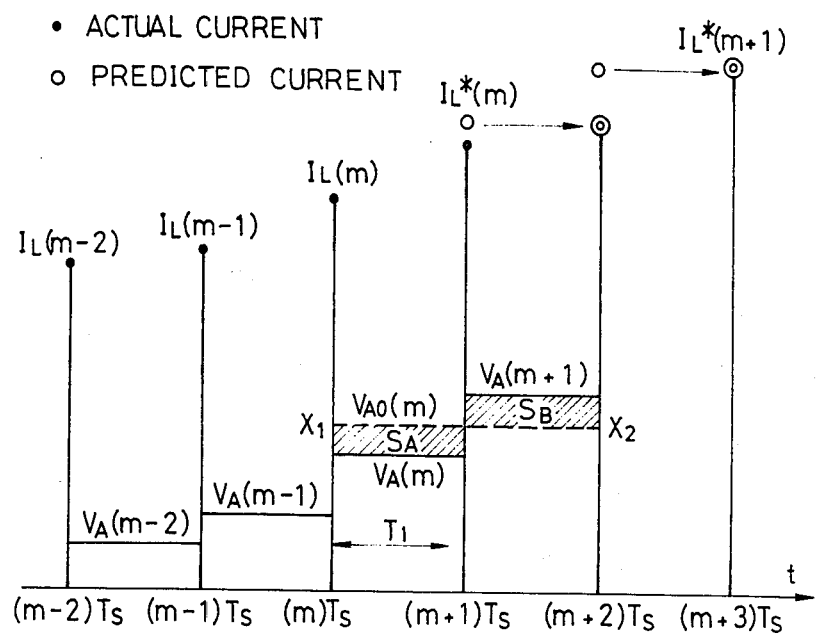

To compensate for the effect of computing time, a double period of sampling time $T_S$ is adopted for step T of Dead Beat control as explained below. At first, referring to FIG. 16 the step number of sampling, m is used to distinguish from k of discretization of Dead Beat control. Now at $t = m \cdot T_S$, prediction of load current $I_L^*(m)$ at $t = (m+1)T_S$ is derived using $I_L(m-2)$, $I_L(m-1)$, $I_L(m)$ by second order prediction method. And this value is used as an approximate prediction of load current at $t = (m+2)T_S$. Then calculation of the Dead Beat control is started to get the necessary inverter voltage to bring the load current which is $I_L(m)$ at $t = m \cdot T_S$, to $I_L^*(m)$ at $t = (m+2)T_S$. For this calculation, the microprocessor spends time $T_1$ as shown in FIG. 16. Then during $t = mT_S$ to $t = (m+1)T_S$, the result of former calculation $V_A(m)$ is given to the PWM circuit.

Suppose the result $V_{AO}(m)$ of above calculation is as the line $X_1$-$X_2$ in FIG. 16, then it becomes clear that $V_A(m)$ was short as shown by area $S_A$. Then to compensate this shortage, $V_A(m+1)$ which equalizes area $S_B$ to $S_A$, is calculated as $V_A(m+1) = 2 V_{AO}(m) - V_A(m)$ and given to the PWM circuit during next $T_S$.

In above explanation, capacitor $C_p$ is considered to be separated from the load 5, as shown in FIG. 6. But as an another embodiment that capacitor can be thought as one part of load 5, and then in this case, the block 202 for capacitor current command is eliminated and inverter current $I_A$, that is the output of sensor 11a is given as the feedforward signal instead of load current $I_L$, that is the output of sensor 11b. Even in this case, the same construction of the current minor loop can be adopted. That is, in the procedure to construct current minor loop, Cp is considered explicitly as from equation (1) to equation (11).

Figure 17:
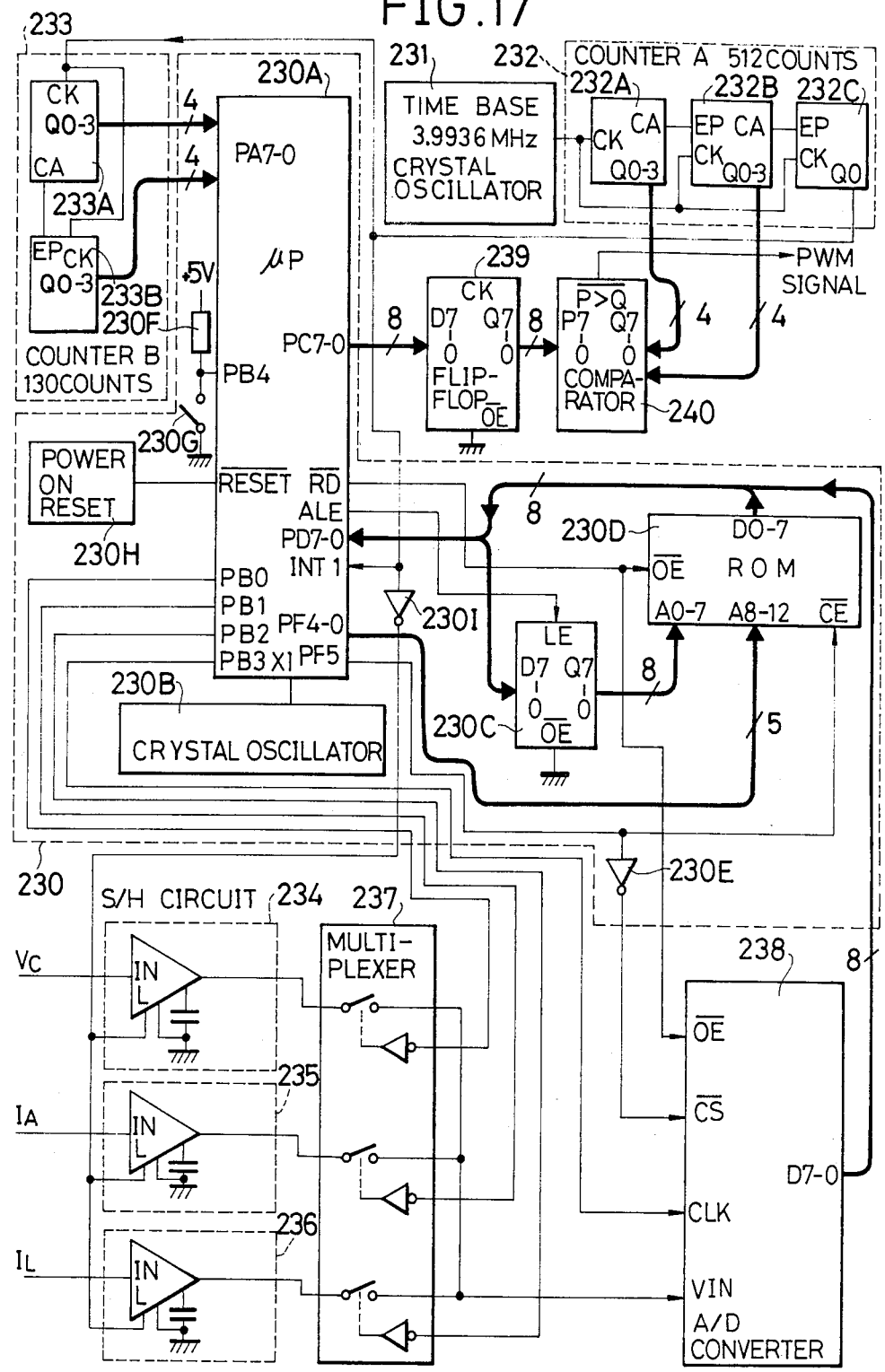

A specific circuit for carrying out the digital sampling control as shown in FIG. 17, comprises a microprocessor system 230 which implements the calculation of the foregoing Dead Beat control, a crystal oscillator 231 as a time base, a counter circuit-A 232 which performs 512 counts, a counter circuit-B 233 which performs 130 counts, sample hold circuits 234, 235 and 236 which sample and hold the voltage Vc, currents $I_A$ and $I_L$ respectively, a multiplexer 237, an analog-digital (A/D) converter 238, a flip-flop circuit 239, and a comparator 240. The microprocessor system 230 is composed of a single-chip microprocessor 230A, a crystal oscillator 230B, a latch circuit 230C, a ROM 230D, inverters 230E and 230I, a resistor 230F, a switch 230G, and a Power ON Reset circuit 230H.

TABLE

| Name | Number |
|---|---|
| microprocessor | 230A |
| crystal oscillator | 230B |
| latch circuit | 230C |
| read only memory | 230D |
| crystal oscillator | 231 |
| counter circuit-A | 232 |
| counter circuit-B | 233 |
| sample hold circuits | 234–236 |
| multiplexer | 237 |
| A-D converter | 238 |
| flip-flop circuit | 239 |
| comparator | 240 |

Operation of the control circuit in the above constitution will be described. The single-chip microprocessor 230A acts using the crystal oscillator 230B as the system clock connected to the X1 terminal. The latch circuit 230C is connected to the port terminal PD7-0 of the address data bus of the microprocessor 230A, and latches the lower 8 bits of the address in response to a signal of the ALE terminal. The terminal PF5-0 of the port F outputs the upper 6 bits of the address, and when the address is 0000H-1FFFH the ROM 230D is accessed. The control program is stored in the ROM 230D, and data is read in the single-chip microprocessor 230A in response to a signal of the $\overline{RD}$ terminal. The switch 230G is a switch of start/stop operation of the inverters and connected to the pull-up resistor 230F, and the joint is connected to the terminal PB4 of the microprocessor 230A. The Power ON Reset circuit 230H is inputted to the $\overline{RESET}$ terminal, and resets the single-chip microprocessor 230A when the control power source is turned on.

The counter circuit-A 232 performs the frequency dividing of the output from the crystal oscillator 231 as the time base, and generates a sawtooth wave signal, which is the reference value of the pulse width modulation, and an interrupt signal to determine the sampling time. The interrupt signal is inputted to the interrupt terminal INT1 of the single-chip microprocessor 230A, and execution of the control program is started by the interrupt signal. The counter circuit-B 233 receives output of the counter-A 232 and further reduces the frequency, and produces the time reference for the sinusoidal wave voltage reference and inputs it as signal of 8 bits to the terminal PA7-0 of the port A of the single-chip microprocessor 230A. The counter circuit-A 232 is composed of program counters 232A, 232B and 232C, and the counter circuit-B 233 is composed of program counters 233A and 233B. In these counter circuits, in order to generate the sinusoidal wave output voltage of 60 Hz, the time base of 3.9936 MHz outputted from the crystal oscillator 231 is frequency-divided by 512 in the counter circuit-A 232, and is further frequency-divided by 130 in the counter circuit-B 233. Since the interrupt signal corresponds to the frequency dividing of the sawtooth wave signal by 2, the sinusoidal wave output voltage of 60 Hz is controlled by the carrier frequency 15.6 kHz and the sampling frequency 7.8 kHz. That is, since the period of the PWM is 64 μs, being a half of the sampling period 128 μs, it is outputted twice in the same pulse width. This is effected so that the carrier frequency is made higher than audio frequency.

The voltage $V_c$, the currents $I_A$ and $I_L$ required for the waveform control are taken by the sample hold circuits 234–236. In order to take signals of the same time, the same signal as the interrupt signal inputted to the interrupt terminal INT$_1$ is supplied commonly to all sample hold circuits 234–236. These sample hold circuits 234–236 act so that value at a moment of the interrupt signal is held during the ½ sampled time and sample during the residual ½ sampling time. Analog signals held in the sample hold circuits 234–236 are selected by the multiplexer 237 and converted into digital signals by the A-D converter 238. Action of the multiplexer 237 and the A-D converter 238 is controlled by the terminals PB0–PB3 of the port B of the single-chip microprocessor 230A. For example, if the address of the A-D converter 238 is 200H, the single-chip microprocessor 230A selects a chip by signal from the terminal PF5 through the inverter 230E, and analog signal is read in the A-D converter 238 by signal from the terminal $\overline{RD}$. The inverter output voltage command being a calculation result of the single-chip microprocessor 230A is supplied from the terminal PC7-0 of the port C to the latch circuit 239 every sampling time, and compared with the sawtooth wave of counter A by the comparator 240; thereby the PWM signal is obtained.

Figure 18:
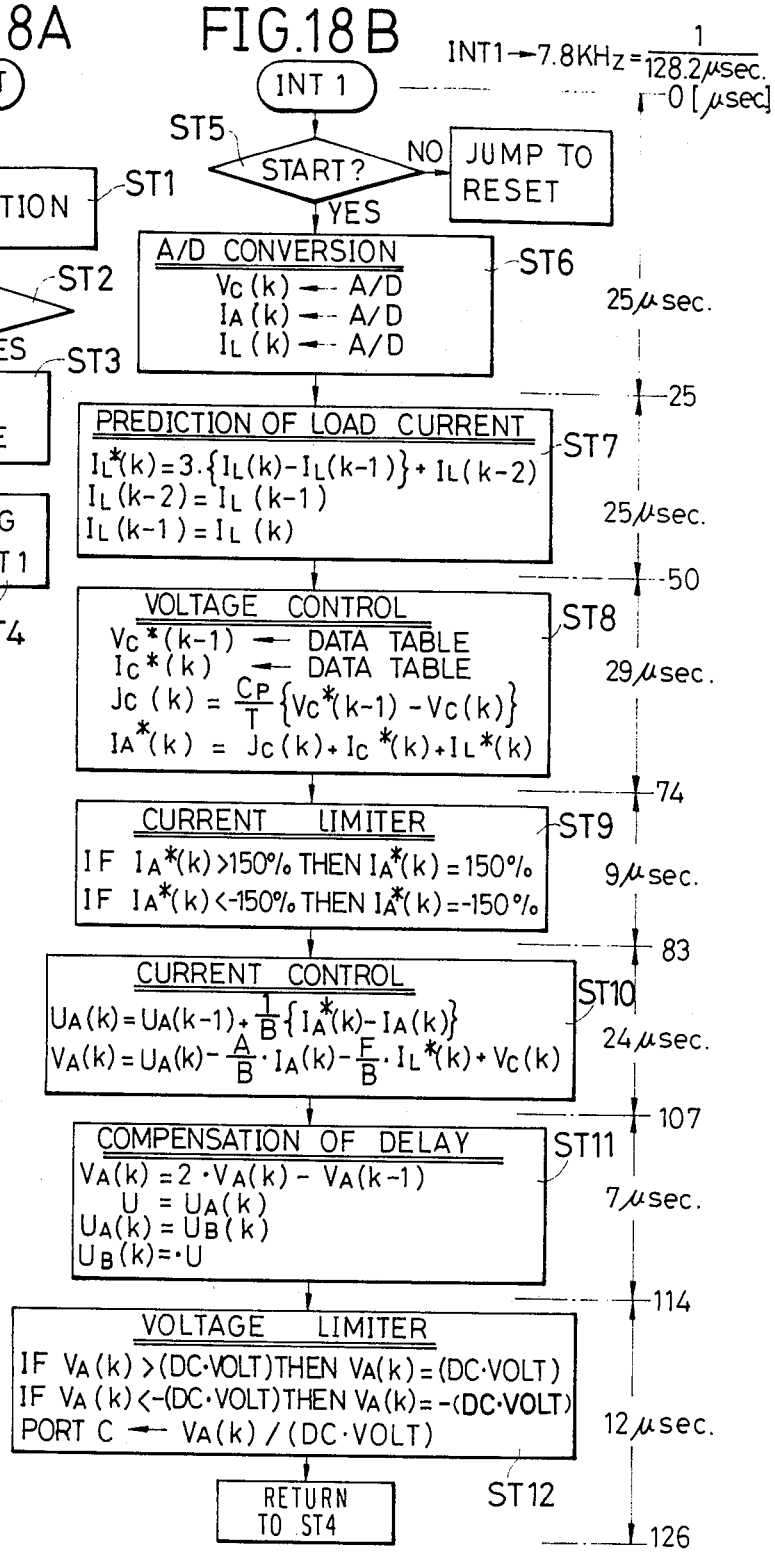

Next, the execution process of the control program will be described referring to flow charts of FIGS. 18A, 18B.

First, when the control power source is turned on, the microprocessor 230A is reset by the $\overline{RESET}$ terminal. And then, as shown in FIG. 18A, the microprocessor 230A executes the initialized program and sets the port (ST1). Next, discrimination is performed regarding whether or not the switch 230G is at state of inverter start (ST2). If the switch 230G is at the start state, the microprocessor 230A allows the interrupt receiving (ST3), and the process becomes the interrupt waiting state (ST4). Since the calculation of the Dead Beat control is carried out per interrupt of 7.8 kHz, the operation time of the microprocessor 230A must be 1/7.8 (kHz)=128.2 (μsec) or less. Consequently, maximum values of the processing time and the accumulation time per each block are shown at the lateral side of the flow chart of the interrupt program shown in FIG. 18B. The values are the calculation time when μPD7810 is used at the system clock of 15 MHz. The microprocessor 230A executes the calculation of steps ST5–ST12 as hereinafter described at a maximum of 126 μsec.

The calculation process of the interrupt program will now be described according to the flow chart of FIG. 18B.

ST5—When the switch 230G is at the state of inverter OPERATION, program flow goes to ST6 and the inverter starts operation or continues operation. When the switch 230G is at the state of inverter STOP, the program flow jumps to RESET and, the initialized program, shown in FIG. 18A, is executed, and the inverter stops operating.

ST6—The voltage $V_C$, the currents $I_A$ and $I_L$ are read from the A-D converter 238.

ST7—The load current is predicted.

ST8—The voltage control loop is calculated, and the current command value $I_A{}^*$ is created.

ST9—The current command value $I_A{}^*$ is limited by the limiter.

ST10—The current control loop is calculated, and the inverter output voltage command value $V_A$ is created.

ST11—The dead time of operation is compensated.

ST12—The inverter output voltage command value $V_A$ is limited by the limiter, and divided by the DC voltage and outputted as the duty command value to the PWM circuit.

After ST12, flow goes to ST4, and waits for INT1 signal from counter A. The above explanation from ST5 to ST4 is program flow of one sampling interval. If switch 230G is changed to STOP position during the above sampling interval, program flow jumps to RESET when flow comes to ST5, and the inverter stops operating.

In the above calculation, in order to reduce the processing time, process of calculating the control gain by multiplication may be performed only by referring to the DATA-TABLE where the control gain is previously calculated by multiplication, and therefore the actual calculation need not be performed. Also the division by the DC voltage in ST12 may be performed only by reading the DATA-TABLE so as to avoid the time-consuming calculation.

Figure 19:
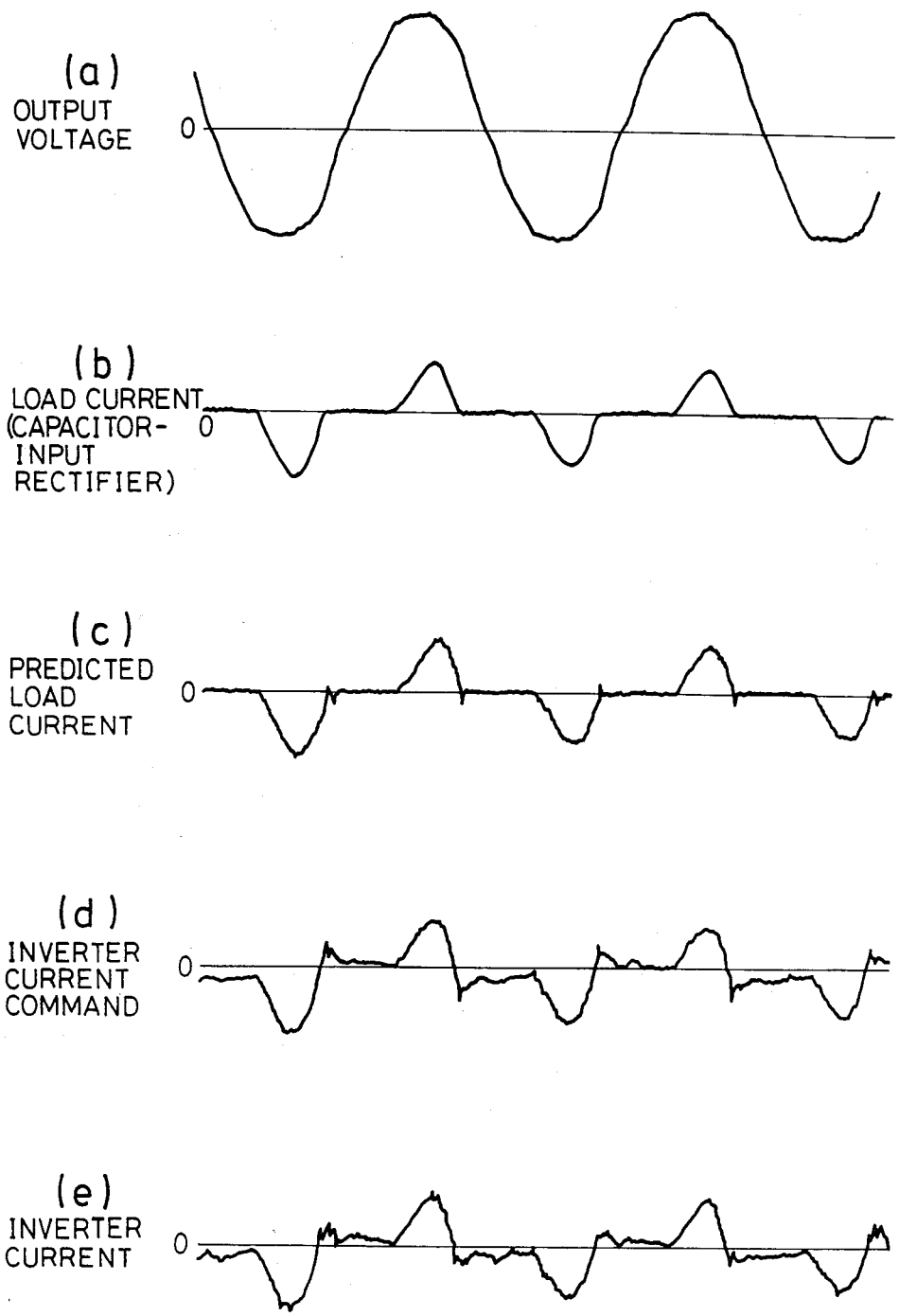

FIG. 19 shows a set of waveforms at various portions of the system based on the foregoing principle in which the inverter is combined with a capacitor-input rectifier load. The distortion of the output voltage is less than 5% for the rectifier load which is the inverter rated kW multiplied by 0.8. A simulation proved that the quality of distortion can be further improved by making the sampling period below 100 μs.

Although the embodiment shown in FIG. 6 uses a current sensor 11b to detect load current $I_L$, this current sensor can be eliminated by adopting a direct load current detection algorithm as follows.

From FIG. 7, load current $I_L$ can be expressed by equation (20).

$$I_L = I_A - I_C = I_A - C_p \frac{dV_C}{dt} \quad (20)$$

Then, load current $I_L$ can be calculated as the difference of inverter current $I_A$ and capacitor current $I_C$. And also capacitor current $I_C$ can be estimated from differential calculus of the capacitor voltage $V_C$ multiplied by constant capacitor value $C_p$.

Thus load current can be estimated indirectly without load current sensor 11b.

Although the embodiments have been described for the case of a single-phase inverter, this concept of controlling a PWM inverter is also applicable to a three-phase inverter using a similar control circuit for each phase and providing a three-phase AC reference voltage.

Although in the above embodiments, the current control minor loop has been described for the cases of the triangular wave comparison system and digital finite-time settling control system, other methods such as the hysteresis comparator system can of course be employed.

Although the above description has been dedicated to a voltage-type inverter, the present invention can also be applied to an inverter-cycloconverter system in which, as shown in FIG. 20 as the third embodiment of this invention, a high-frequency inverter 300 has its output through a transformer 303 controlled by a cycloconverter 301 to an arbitrary frequency and it is fed through a filter 302 for shaping to become a sinusoidal waveform before being supplied to a load.

Although in the above description the "capacitor voltage" has been used as the control object, other terms such as "the output line voltage" can also be used.

As described above, the inventive control circuit is designed to produce a current command value for a converter to produce a sinusoidal output voltage and to implement instantaneous-value control so that the converted output current follows the current command, with resultant effectiveness including a satisfactory accuracy and transient response of the converted output voltage, a smaller distortion in the output voltage against a harmonic load current, and ensured over-current protection for the switching devices by the current control minor loop against an inrush current or short-circuitting in the load. Specifically, a harmonic load current is controlled on a feed-forward basis, instead of a voltage error feedback correction, whereby production of an accurate voltage and waveform can be accomplished.

What is claimed is:

1. A control circuit for a power conversion apparatus which produces sinusoidal alternating current (AC) power through multiple switching operations of switching devices within a cycle and supplies the power to a load, said control circuit comprising a current control minor loop which controls instantaneous value of output current of said power conversion apparatus in compliance with a current reference value, said output current including a load current component, said current reference value being determined as the sum of the load current component based on a detected value of load current component, and a modification current component produced by a voltage controller to correct error of output line voltage of said power conversion apparatus with respect to a voltage reference provided by a sinusoidal voltage reference generator.

2. A control circuit according to claim 1, wherein said load current component comprises a predicted value of load current.

3. A control circuit according to claim 2, wherein said predicted value of load current is determined based on a quadratic prediction method using a preceding load current value and a present load current value.

4. A control circuit according to claim 1, and further including a parallel capacitor constituting an output filter, wherein the current of said parallel capacitor is added to said reference value to the minor loop.

5. A control circuit according to claim 1, wherein said minor loop comprises a sampled-data control system, and control operation of said minor loop is determined based on the output line voltage, output current of said power conversion apparatus, detected value or predicted value of load current and command value of output current of said power conversion apparatus.

6. A control circuit according to claim 1, wherein said modification current component is determined through sampled-data control using a finite settlement control system which is based on a command value of output line voltage and a detected value of output line voltage.

7. A control circuit according to claim 1, wherein control operation of said minor loop is determined by a finite settlement control system which is based on said output line voltage, output current of said power conversion apparatus, and the detected value or predicted value of load current.

8. A control circuit according to claim 1, wherein said power conversion apparatus comprises an inverter which converts direct current (DC) power into AC power.

9. A control circuit according to claim 1, wherein control operation of said minor loop is determined by a finite settlement control system where gains of the finite settlement control system are determined using discretization time T which is twice sampling time $T_S$.

10. A control circuit according to claim 9 wherein each sampling period result $V_A(m)$ of calculation of last sampling time is put out to determine the output of this sampling time, and after calculation of output $V_{AO}(m)$ of this discretization period is obtained, output $V_A(m+1)$ of next sampling time of control circuit is determined as $$V_A(m+1) = 2V_{AO}(m) - V_A(m)$$

11. A control circuit according to claim 1, wherein said detection of the value of said load current component is performed indirectly by using output current $I_A$ of said conversion apparatus and current $I_C$ of a filter capacitor, and getting the difference $I_A - I_C$.

12. A control circuit according to claim 1, wherein said power conversion apparatus comprises a cycloconverter connected to a high frequency inverter, said cycloconverter converting AC power from said inverter into power having an arbitrary frequency.

13. A control circuit according to claim 7 where gains of the finite settlement control system are determined using discretization time T which is twice sampling time $T_S$.

* * * * *

UNITED STATES PATENT AND TRADEMARK OFFICE
CERTIFICATE OF CORRECTION

PATENT NO.   : 4,757,434

DATED        : July 12, 1988

INVENTOR(S)  : Takao Kawabata et al.

It is certified that error appears in the above-identified patent and that said Letters Patent is hereby corrected as shown below:

Column 13, line 36, "sampled time and sample" should be --sampling time and sampled--.

Signed and Sealed this

Twenty-first Day of March, 1989

Attest:

DONALD J. QUIGG

*Attesting Officer*    *Commissioner of Patents and Trademarks*